US010285881B2

(12) United States Patent
Kita (10) Patent No.: US 10,285,881 B2
(45) Date of Patent: May 14, 2019

(54) ELECTRICALLY POWER ASSISTED WHEELCHAIR AND METHOD OF CONTROLLING ELECTRICALLY POWER ASSISTED WHEELCHAIR (71) Applicant: YAMAHA HATSUDOKI KABUSHIKI KAISHA, Iwata-shi, Shizuoka (JP)

(72) Inventor: Yukio Kita, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/767,662

(22) PCT Filed: Oct. 19, 2015

(86) PCT No.: PCT/JP2015/079433
§ 371 (c)(1),
(2) Date: Apr. 12, 2018

(87) PCT Pub. No.: WO2017/068621
PCT Pub. Date: Apr. 27, 2017

(65) Prior Publication Data
US 2018/0271725 A1 Sep. 27, 2018

(51) Int. Cl.
*A61G 5/00* (2006.01)
*A61G 5/04* (2013.01)
(Continued)

(52) U.S. Cl.
CPC ............ *A61G 5/048* (2016.11); *A61G 5/02* (2013.01); *A61G 5/024* (2013.01); *A61G 5/04* (2013.01); *A61G 5/1008* (2013.01); *B60W 10/08* (2013.01); *B60W 30/18109* (2013.01); *B60W 30/18127* (2013.01); *A61G 5/041* (2013.01); *B60W 2300/38* (2013.01); *B60W 2422/70* (2013.01); *B60W 2520/28* (2013.01);
(Continued)

(58) Field of Classification Search
None
See application file for complete search history.

(56) References Cited

U.S. PATENT DOCUMENTS 5,818,189 A * 10/1998 Uchiyama ............ A61G 5/045
318/488

FOREIGN PATENT DOCUMENTS

EP 0 925 771 A1 6/1999
EP 2 740 455 A1 6/2014
(Continued)

OTHER PUBLICATIONS

Official Communication issued in International Patent Application No. PCT/JP2015/079433, dated Nov. 17, 2015.

*Primary Examiner* — Paul N Dickson
*Assistant Examiner* — Hilary L Johns
(74) *Attorney, Agent, or Firm* — Keating & Bennett, LLP (57) ABSTRACT

An electrically power assisted wheelchair includes a hand rim, a wheel that is rotated by receiving a torque applied to the hand rim, and a drive controller configured or programmed to apply auxiliary power to the wheel based on the torque applied to the hand rim. The drive controller is configured or programmed to decelerate rotation of the wheel when the wheel is rotating and no torque is applied to the hand rim in a brake mode in which a brake torque acting in a direction reverse to a rotation direction of the wheel is applied to the wheel.

10 Claims, 8 Drawing Sheets (51) Int. Cl.
    *A61G 5/02*         (2006.01)
    *A61G 5/10*         (2006.01)
    *B60W 10/08*       (2006.01)
    *B60W 30/18*       (2012.01)

(52) U.S. Cl.
    CPC ..... *B60W 2530/14* (2013.01); *B60W 2540/00* (2013.01); *B60W 2710/083* (2013.01); *B60W 2720/30* (2013.01)

(56) References Cited

FOREIGN PATENT DOCUMENTS

| | | |
|---|---|---|
| JP | 11-342159 A | 12/1999 |
| JP | 2000-42045 A | 2/2000 |
| JP | 2006-141646 A | 6/2006 |
| JP | 2015-13009 A | 1/2015 |
| JP | 2015-160451 A | 9/2015 |

* cited by examiner

ELECTRICALLY POWER ASSISTED WHEELCHAIR AND METHOD OF CONTROLLING ELECTRICALLY POWER ASSISTED WHEELCHAIR

BACKGROUND OF THE INVENTION

1. Field of the Invention

The present invention relates to an electric wheelchair which applies auxiliary power to a wheel based on a torque applied to a hand rim.

2. Description of the Related Art

Conventionally, there is known an electric wheelchair which assists an operation of a user by applying auxiliary power to the wheels in accordance with torques applied to hand rims by a user. In Japanese Patent Application Laid Open Gazette No. 11-342159, an agile operation of the electric wheelchair is achieved by quickly attenuating the auxiliary power to be applied to the wheels after a user releases the hand rims.

In the technique disclosed in Japanese Patent Application Laid Open Gazette No. 11-342159, even after the user releases the hand rims and the auxiliary power is attenuated to zero, the electric wheelchair coasts for a while. In a case where the electric wheelchair is used in a room having a limited space, however, some users do not necessarily like such coasting and seek more agility for the electric wheelchair.

SUMMARY OF THE INVENTION

Preferred embodiments of the present invention provide techniques to reduce the coasting of an electrically power assisted wheelchair and increase the agility thereof.

An electrically power assisted wheelchair according to a preferred embodiment of the present invention includes a hand rim; a wheel that is rotated by receiving a torque applied to the hand rim; and a drive controller configured or programmed to apply auxiliary power to the wheel based on the torque applied to the hand rim, wherein the drive controller is configured or programmed to decelerate rotation of the wheel that is rotating in a state in which no torque is applied to the hand rim by performing a brake mode in which a brake torque acting in a direction reverse to a rotation direction of the wheel is applied to the wheel.

A method of controlling an electrically power assisted wheelchair according to a preferred embodiment of the present invention includes applying auxiliary power to a wheel based on a torque applied to a hand rim of the electrically power assisted wheelchair, which includes the hand rim and the wheel that is rotated by receiving the torque applied to the hand rim, and decelerating rotation of the wheel that is rotating in a state in which no torque is applied to the hand rim by performing a brake mode in which a brake torque acting in a direction reverse to a rotation direction of the wheel is applied to the wheel.

In a preferred embodiment of the present invention, deceleration of the rotation of the wheel rotating in a state in which no torque is applied to the hand rim is performed in the brake mode in which the brake torque acting in a direction reverse to the rotation direction of the wheel is applied to the wheel. Therefore, in a case where a user applies no torque to the hand rim, the rotation of the wheel is quickly decelerated by the brake torque. As a result, it is possible to reduce or prevent the coasting of the electrically power assisted wheelchair and increase the agility of the electrically power assisted wheelchair.

With the preferred embodiments of the present invention, it is also possible to increase the agility of an electrically power assisted wheelchair.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
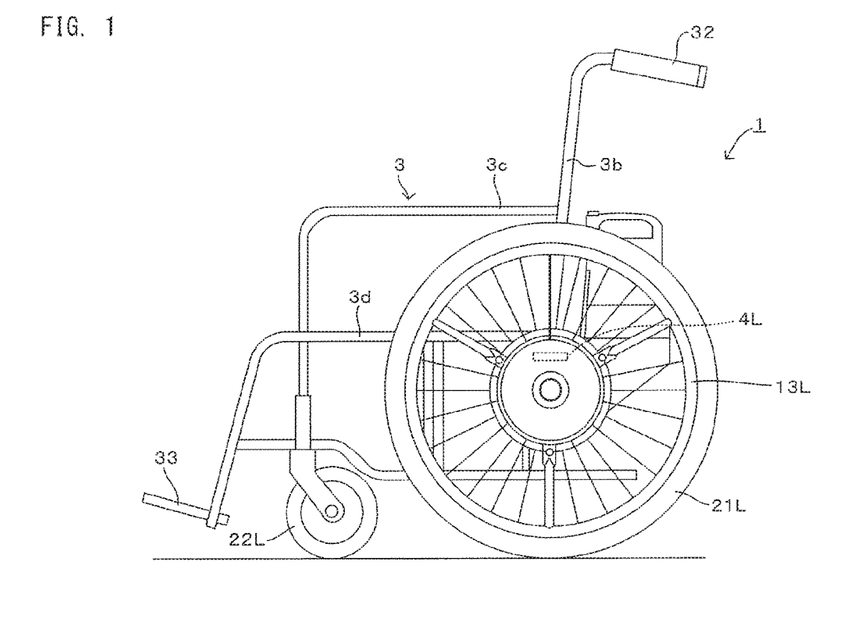
FIG. 1 is a side elevational view showing an electrically power assisted wheelchair according to a preferred embodiment of the present invention.
Figure 2:
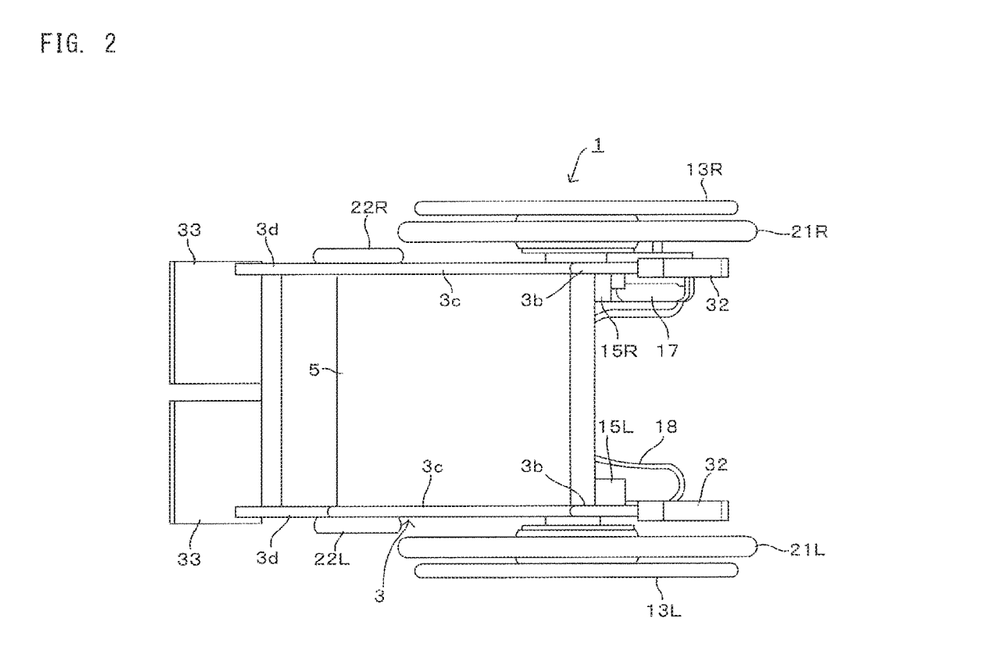
FIG. 2 is a plan view showing the electrically power assisted wheelchair of FIG. 1.

FIG. 1 is a side elevational view showing an electrically power assisted wheelchair according to a preferred embodiment of the present invention. FIG. 2 is a plan view showing the electrically power assisted wheelchair of FIG. 1. The electrically power assisted wheelchair (hereinafter, referred to simply as a "wheelchair") 1 is, for example, a wheelchair in which a power assist system is provided in an already-existing folding manual wheelchair. The wheelchair 1 includes a pair of left and right wheels 21L and 21R, a pair of left and right casters 22L and 22R, and a frame 3 preferably made of pipes.

At a center portion of the frame 3, a sheet 31 of cloth (FIG. 2) is spread, and a user is able to sit on the cloth 31. The frame 3 includes a plurality of arms, including a pair of left and right handle arms 3b at a rear portion of the frame 3. An upper end portion of each handle arm 3b is bent backward, and a grip 32 for a caregiver to grab is attached to the bent portion. From a center portion in a height direction of each handle arm 3b, an arm 3c extends horizontally toward the front of a vehicle body. Respective front end portions of the pair of left and right arms 3c, 3c thus are bent perpendicularly or substantially perpendicularly, extend downward, and the casters 22L and 22R are supported rotatably at lower end portions of the left and right arms 3c, 3c. A pair of left and right arms 3d, 3d are disposed below the left and right arms 3c, 3c. A front portion of each arm 3d, 3d extends diagonally downward toward the front of the vehicle body, and at a front end portion thereof, a step 33 is attached. The pair of left and right steps 33, 33 thus define a footrest for the user. On the rear side of the casters 22L and 22R, the wheels 21L and 21R are attached in a detachable and attachable manner to left and right portions of the frame 3, respectively, and movably support the frame 3 in cooperation with the casters 22L and 22R. Though not shown, each of the wheels 21L and 21R is supported rotatably via a ball bearing by an axle supported by a boss portion welded to the frame 3.

A ring-shaped hand rim 13L is located outside the wheel 21L, and the user manually operates the hand rim 13L to rotate the wheel 21L. Further, in a hub of the hand rim 13L, a torque sensor 4L is provided to detect a torque that the user applies to the hand rim 13L. A drive motor 15L is attached to the frame 3 and connected to a rotation shaft of the wheel 21L, and applies auxiliary power to the wheel 21L based on the torque detected by the torque sensor 4L. Also on the right side, similarly to the left side, a torque sensor 4R detects a torque that the user applies to a hand rim 13R, and a drive motor 15R applies auxiliary power to the wheel 21R based on the torque detected by the torque sensor 4R. The specific structure of the hand rims, the torque sensors, and the drive motors attached to the wheels are described in detail in, for example, Japanese Patent Application Laid Open Gazette No. 2015-13009, and a detailed description thereof is omitted herein.

In order to supply electric power to the drive motors 15L and 15R, a battery 17 is mounted on the frame 3. The battery 17 is attached at a location in the vicinity of the wheel 21R in a detachable and attachable manner, and directly supplies electric power to the drive motor 15R. Further, a wire harness 18 is mounted on the frame 3 from the side of the wheel 21R to the side of the wheel 21L, and the battery 17 supplies electric power to the drive motor 15L through the wire harness 18.

Figure 3:
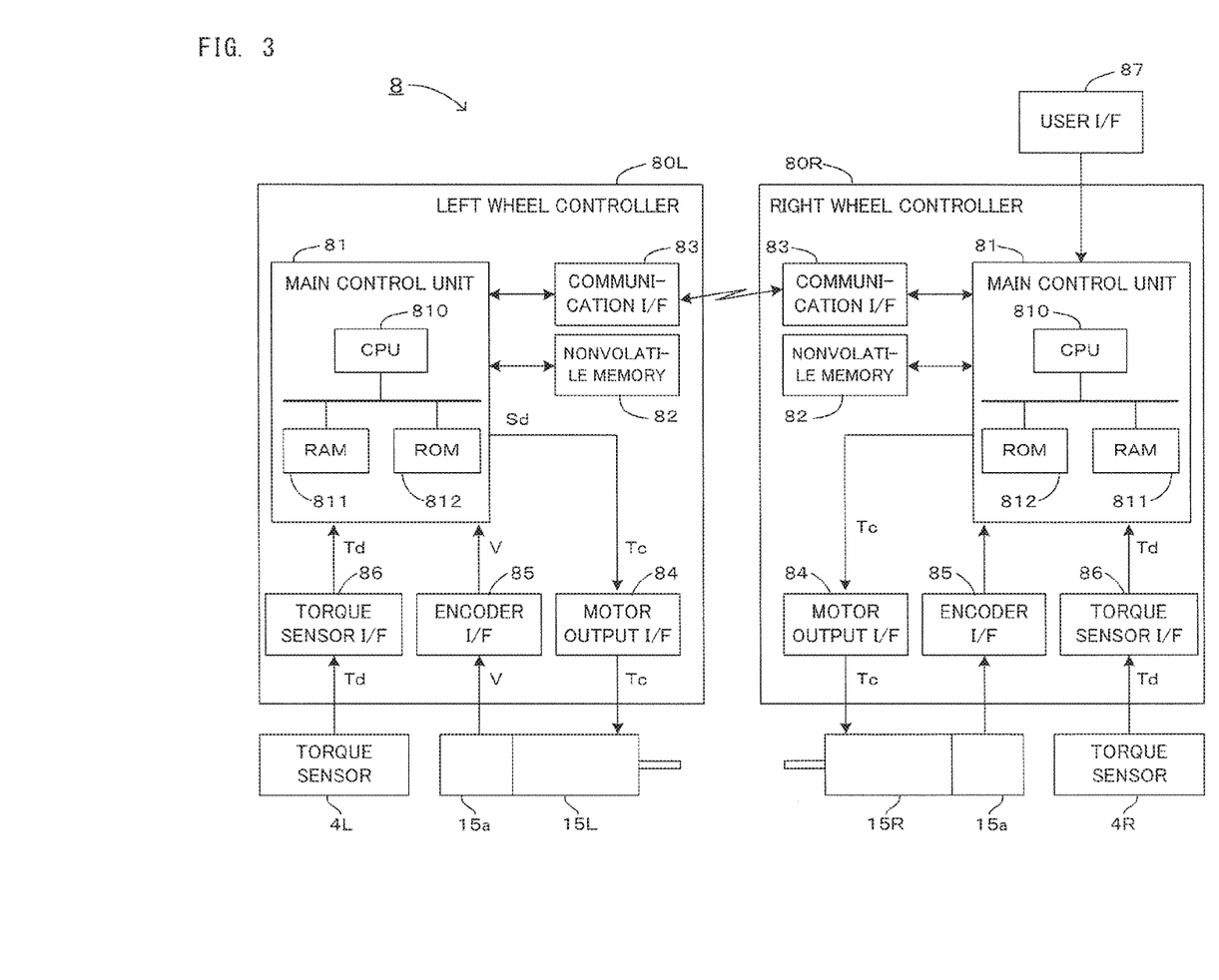
FIG. 3 is a block diagram partially showing a control device provided in the electrically power assisted wheelchair of FIG. 1.

FIG. 3 is a block diagram partially showing a control device provided in the electrically power assisted wheelchair of FIG. 1. The control device 8 shown in FIG. 3 includes a left wheel controller 80L for the left wheel 21L and a right wheel controller 80R for the right wheel 21R. Since the controllers are provided with similar elements, the left wheel controller 80L will be described in detail, and an outline of the right wheel controller 80R will be described.

The left wheel controller 80L includes a main control unit 81 which manages the overall control of the auxiliary power and a nonvolatile memory 82 which stores therein information required to control the auxiliary power. The main control unit 81 includes, for example, a microcomputer including a CPU (Central Processing Unit) 810, a RAM (Random Access Memory) 811, and a ROM (Read Only Memory) 812.

Further, the left wheel controller 80L includes I/Fs (interfaces) that transmit and receive signals using various types of hardware, and specifically includes a communication I/F 83, a motor output I/F 84, an encoder I/F 85, and a torque sensor I/F 86. The communication I/F 83 performs communication with the right wheel controller 80R. The motor output I/F 84 is connected to the drive motor 15L, and the main control unit 81 provides a drive command Tc to the drive motor 15L through the motor output I/F 84. The drive motor 15L thus generates a torque having a magnitude indicated by the drive command Tc. The encoder I/F 85 is connected to an encoder 15a provided in the drive motor 15L, and the main control unit 81 receives an output signal from the encoder 15a through the encoder I/F 85 to acquire a rotation velocity V of the drive motor 15L.

The torque sensor I/F 86 is connected to the torque sensor 4L which outputs a detection result of the torque applied to the left hand rim 13L as a torque detection value Td, and the main control unit 81 receives the torque detection value Td outputted from the torque sensor 4L through the torque sensor I/F 86. Then, the main control unit 81 generates the drive command Tc based on the torque detection value Td detected at the left hand rim 13L and sends this drive command Tc to the drive motor 15L connected to the left wheel 21L. An auxiliary power based on the torque that the user applies to the left hand rim 13L is provided to the left wheel 21L.

On the other hand, the right wheel controller 80R is provided with similar elements as those provided in the above-described left wheel controller 80L. Specifically, in the right wheel controller 80R, the main control unit 81 generates a drive command Tc based on a torque detection value Td detected at the right hand rim 13R and sends this drive command Tc to the drive motor 15R connected to the right wheel 21R. An auxiliary power based on the torque that the user applies to the right hand rim 13R is provided to the right wheel 21R.

Further, the main control unit 81 of the right wheel controller 80R is connected to a user I/F 87 attached to the frame 3. Specifically, the user I/F 87 is controlled by the main control unit 81 of the right wheel controller 80R, and the main control unit 81 performs computations in accordance with an input to the user I/F 87 by the user and displays the computation results on the user I/F 87 for the user.

Figure 4:
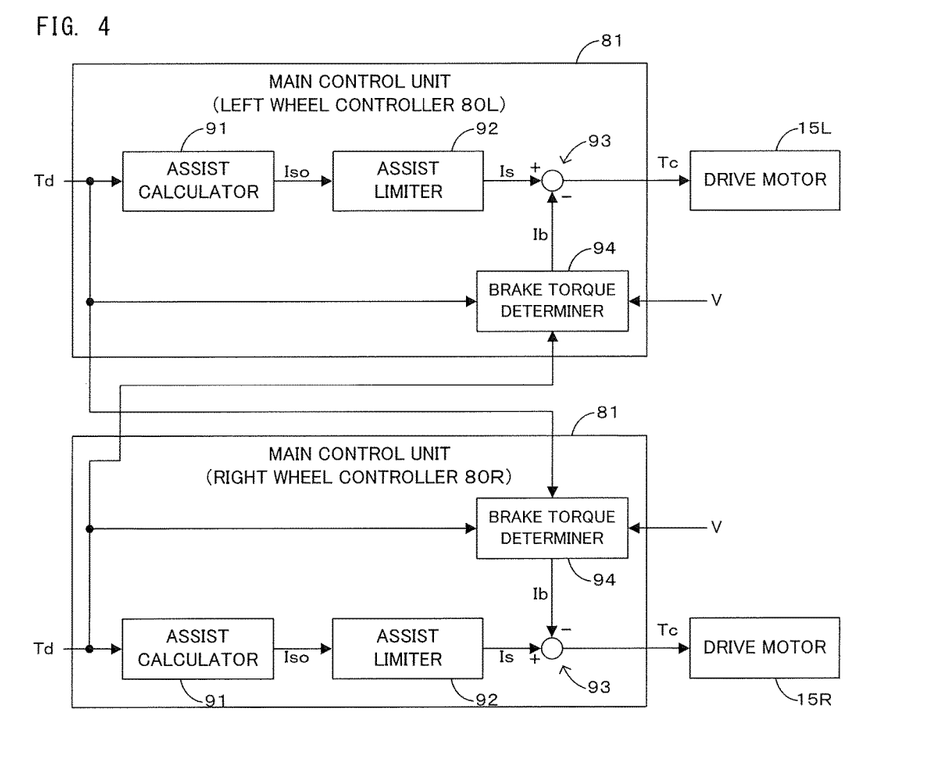
FIG. 4 is a block diagram showing an electrical configuration of each of the controllers.

FIG. 4 is a block diagram showing an electrical configuration of each of the controllers. As shown in FIG. 4, the main control unit 81 in each of the left wheel controller 80L and the right wheel controller 80R executes a predetermined drive control program to define and function as an assist calculator 91, an assist limiter 92, a subtractor 93, and a brake torque determiner 94. Subsequently, the left wheel controller 80L will be described in detail, and then an outline of the right wheel controller 80R will be described.

In the left wheel controller 80L, when the torque detection value Td indicating the torque applied to the left hand rim 13L is inputted to the assist calculator 91 through the torque sensor I/F 86, the assist calculator 91 calculates a reference current value Iso in accordance with the torque detection value Td. The reference current value Iso is obtained by, for example, multiplying the torque detection value Td by a gain Go (Iso=Go×Td). The reference current value Iso obtained by the assist calculator 91 is a current value in a direction in which the wheel 21L is made to rotate by the direction of the torque applied to the hand rim 13L. When the torque is applied to the hand rim 13L in a direction in which the wheelchair 1 moves forward, the reference current value Iso has a positive value, and when the torque is applied to the hand rim 13L in a direction in which the wheelchair 1 moves backward, the reference current value Iso has a negative value. The method of obtaining the reference current value Iso is not limited to the above-described method, and the reference current value Iso (drive signal) may be obtained by using, for example, the method of calculating a drive signal disclosed in Japanese Patent Application Laid Open Gazette No. 2015-13009.

The reference current value Iso obtained by the assist calculator 91 is inputted to the assist limiter 92, and the assist limiter 92 compares the reference current value Iso with a threshold current value Ih. When the reference current value Iso is equal to or less than the threshold current value Ih, the assist limiter 92 outputs the reference current value Iso as an auxiliary current value Is, and when the reference current value Iso is more than the threshold current value Ih, the assist limiter 92 outputs the threshold current value Ih as the auxiliary current value Is. Thus, the auxiliary current value Is outputted from the assist limiter 92 is limited to be not larger than the threshold current value Ih. Herein, the threshold current value Ih is a value of the current supplied to the drive motor 15L which drives the wheel 21L at a predetermined limited velocity, and when a current having the threshold current value Ih is supplied to the drive motor 15L, the wheel 21L rotates at the limited velocity. Therefore, by limiting the auxiliary current value Is to not larger than the threshold current value Ih, it is possible to limit the rotation velocity of the wheel 21L driven by the drive motor 15L to not higher than the limited velocity. The method of setting the threshold current value Ih is not limited to the above-described method, and the threshold current value Ih may be set so that, for example, the temperature of the drive motor 15L or the battery 17 may be not higher than a predetermined temperature limit. Further, the assist limiter 92 may be omitted and the reference current value Iso may be outputted as the auxiliary current value Is without any processing.

The auxiliary current value Is outputted from the assist limiter 92 is inputted to the subtractor 93, and the subtractor 93 inputs the drive command Tc (current) having a value obtained by subtracting a brake current value Ib described below from the auxiliary current value Is, to the drive motor 15L. Specifically, the drive motor 15L rotates with the current (=Is−Ib) inputted as the drive command Tc, to rotate the left wheel 21L. The auxiliary power in accordance with the torque that the user applies to the left hand rim 13L is provided to the left wheel 21L, and the wheel 21L is driven.

Figure 5:
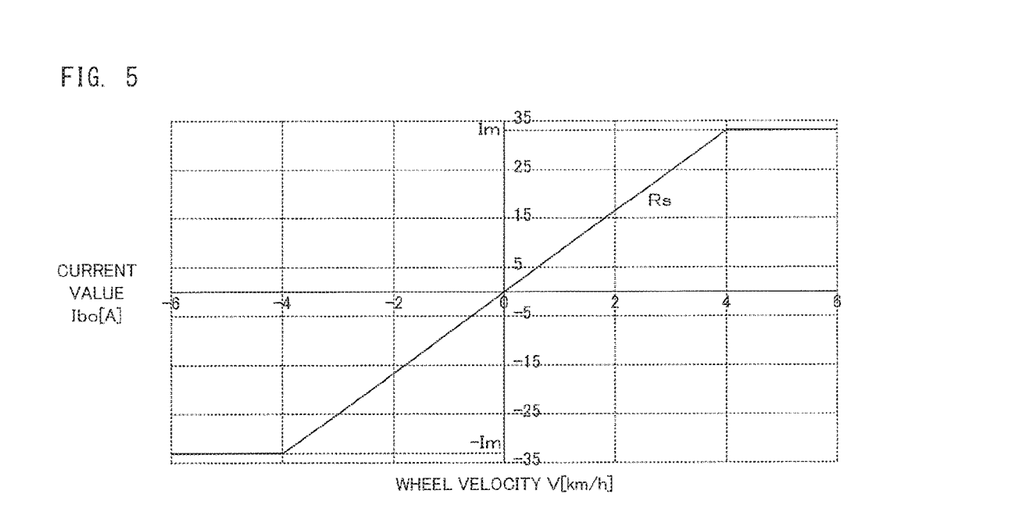
FIG. 5 is a graph schematically showing an example of the velocity-dependent conversion rule used by the brake torque determiner to calculate the brake current value.
Figure 6:
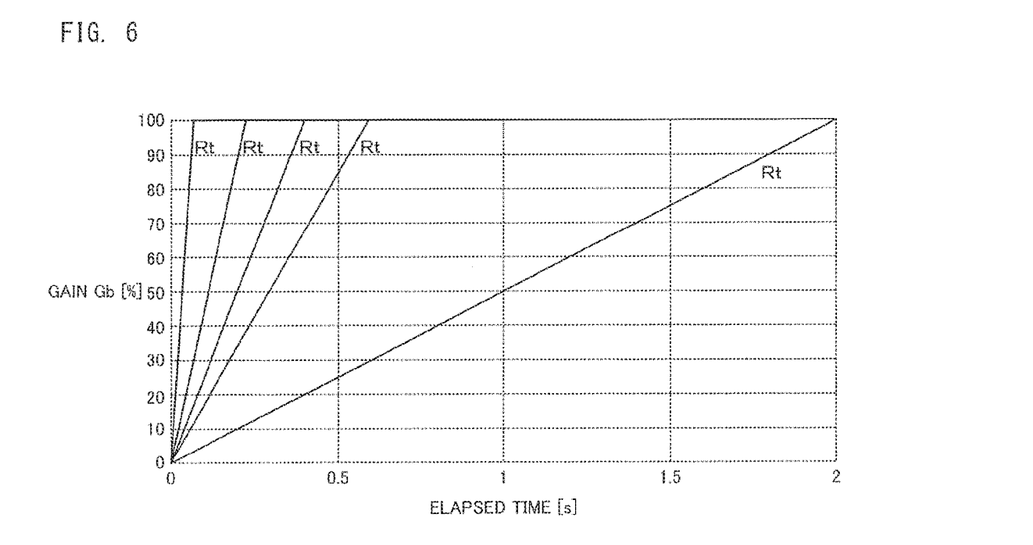
FIG. 6 is a graph schematically showing an example of the time-dependent conversion rule used by the brake torque determiner to calculate the brake current value.

The brake torque determiner 94 calculates the above-described brake current value Ib. Specifically, the brake current value Ib may be calculated by multiplying a reference current value Ibo obtained from a velocity-dependent conversion rule Rs shown in FIG. 5 by a gain Gb obtained from a time-dependent conversion rule Rt shown in FIG. 6. FIG. 5 is a graph schematically showing an example of the velocity-dependent conversion rule used by the brake torque determiner to calculate the brake current value, and FIG. 6 is a graph schematically showing an example of the time-dependent conversion rule used by the brake torque determiner to calculate the brake current value. The velocity-dependent conversion rule Rs and the time-dependent conversion rule Rt are developed and stored in the nonvolatile memory 82 as the drive control program is executed.

FIG. 5 shows the velocity-dependent conversion rule Rs defining a relationship between the rotation velocity V of the wheel and the reference current value Ibo with the rotation velocity V of the wheel represented on a horizontal axis and the reference current value Ibo represented on a vertical axis. Herein, the rotation velocity V is shown assuming that the rotation direction of the wheel 21L in a case in which the wheelchair 1 moves forward is positive and the rotation direction of the wheel 21L in a case in which the wheelchair 1 moves backward is negative. Further, the reference current value Ibo is shown assuming that the direction of the current in which the wheel 21L is made to rotate in a direction in which the wheelchair 1 moves forward is positive and the direction of the current in which the wheel 21L is made to rotate in a direction in which the wheelchair 1 moves backward is negative. FIG. 6 shows the time-dependent conversion rule Rt defining a relationship between an elapsed time t from the time when both the torque detection values Td for the hand rims 13L and 13R become zero (the torque detection values Td are lost) and the gain Gb with the elapsed time t represented on a horizontal axis and the gain Gb represented on a vertical axis. Furthermore, when the times at which the respective torque detection values Td of the hand rims 13L and 13R become zero are different from each other, an elapsed time t between these times is measured.

The torque detection value Td for the left hand rim 13L and the torque detection value Td for the right hand rim 13R are inputted to the brake torque determiner 94 of the left wheel controller 80L through the respective torque sensors I/F 86. Then, when the brake torque determiner 94 confirms that both the torque detection values Td for the hand rims 13L and 13R become zero, the brake torque determiner 94 calculates the brake current value Ib based on the conversion rules Rs and Rt shown in FIGS. 5 and 6.

Specifically, the brake torque determiner 94 acquires the rotation velocity V of the wheel 21L from the encoder 15a of the drive motor 15L through the encoder I/F 85. Then, the brake torque determiner 94 converts the rotation velocity V into the reference current value Ibo based on the velocity-dependent conversion rule Rs. As shown in FIG. 5, when the rotation velocity V is within a predetermined velocity range (for example, about −4 to about 4 km/h), the velocity-dependent conversion rule Rs linearly increases the absolute value of the reference current value Ibo from zero to a predetermined current value Ibm (>0) as the absolute value of the rotation velocity V increases from zero to a predetermined velocity (for example, about 4 km/h). On the other hand. When the rotation velocity is outside the predetermined velocity range, the velocity-dependent conversion rule Rs makes the absolute value of the reference current value Ibo a current value Im regardless of an increase in the absolute value of the rotation velocity V. Further, the positive or negative sign of the reference current value Ibo coincides with the positive or negative sign of the rotation velocity V.

Subsequently, the brake torque determiner 94 measures the elapsed time t from the time when both the torque detection values of the hand rims 13L and 13R become zero, and converts the elapsed time t into the gain Gb based on the time-dependent conversion rule Rt. FIG. 6 shows five time-dependent conversion rules Rt. These time-dependent conversion rules Rt linearly increase the gain Gb from 0% to 100% as the elapsed time t increases from zero, and change the gain Gb with respect to the elapsed times t with different change rates. Then, the brake torque determiner 94 converts the elapsed time t into the gain Gb by using one time-dependent conversion rule Rt that the user selects from among the time-dependent conversion rules Rt using the user I/F 87.

Thus, the brake torque determiner 94 calculates the brake current value Ib (Ib=Gb×Ibo) by multiplying the reference current value Ibo obtained by conversion of the rotation velocity V of the wheel 21L based on the velocity-dependent conversion rule Rs by the gain Gb obtained by conversion of the elapsed time t from the loss of the applied torque based on the time-dependent conversion rule Rt. Then, the subtractor 93 inputs the drive command Tc obtained by subtracting the brake current value Ib from the auxiliary current value Is to the drive motor 15L. In other words, a current having a value obtained by inverting the sign of the brake current value Ib obtained by the brake torque determiner 94 is provided to the drive motor 15L. A brake torque which has a magnitude in accordance with the brake current value Ib and acts in a direction reverse to the rotation direction of the wheel 21L is provided to the wheel 21L by the drive motor 15L and the rotation of the wheel 21L is decelerated.

Further, like the main control unit 81 of the above-described left wheel controller 80L, the main control unit 81 of the right wheel controller 80R executes the drive control program to define and function as the assist calculator 91, the assist limiter 92, the subtractor 93, and the brake torque determiner 94, and develops and stores the velocity-dependent conversion rule Rs and the time-dependent conversion rule Rt in the nonvolatile memory 82. Herein, the velocity-dependent conversion rule Rs and the time-dependent conversion rule Rt which are developed and stored by the right wheel controller 80R are the same as those which are developed and stored by the left wheel controller 80L, respectively.

Then, in the right wheel controller 80R, the assist calculator 91 calculates a reference current value Iso based on the torque detection value Td for the hand rim 13R, and the assist limiter 92 obtains an auxiliary current value Is based on the comparison between the reference current value Iso and the threshold current value Ih. Further, when the brake torque determiner 94 confirms that both the torque detection values Td for the hand rims 13L and 13R become zero, the brake torque determiner 94 calculates a brake current value Ib by multiplying the reference current value Ibo obtained by conversion of the rotation velocity V of the wheel 21R based on the velocity-dependent conversion rule Rs by the gain Gb obtained by conversion of the elapsed time t from the loss of the applied torque based on the time-dependent conversion rule Rt. Furthermore, among the five time-dependent conversion rules Rt, the time-dependent conversion rule Rt used in the right wheel controller 80R is the same as that used in the left wheel controller 80L. Then, the subtractor 93 inputs the drive command Tc obtained by subtracting the brake current value Ib from the auxiliary current value Is to the drive motor 15R. A brake torque which has a magnitude in accordance with the brake current value Ib and acts in a direction reverse to the rotation direction of the wheel 21R is provided to the wheel 21R by the drive motor 15R and the rotation of the wheel 21R is decelerated.

Figure 7:
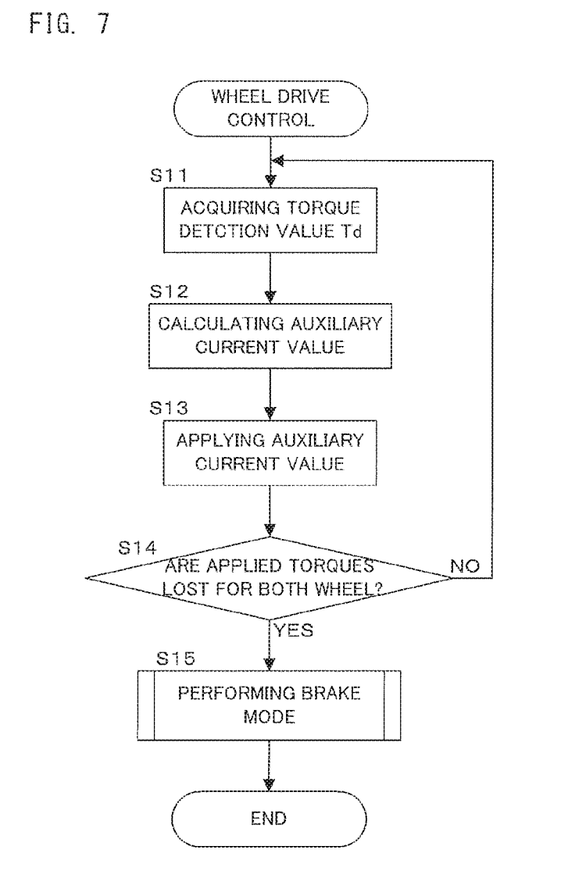
FIG. 7 is a flowchart showing an example of a wheel drive control performed by the main control unit in each of the left and right wheels.
Figure 8:
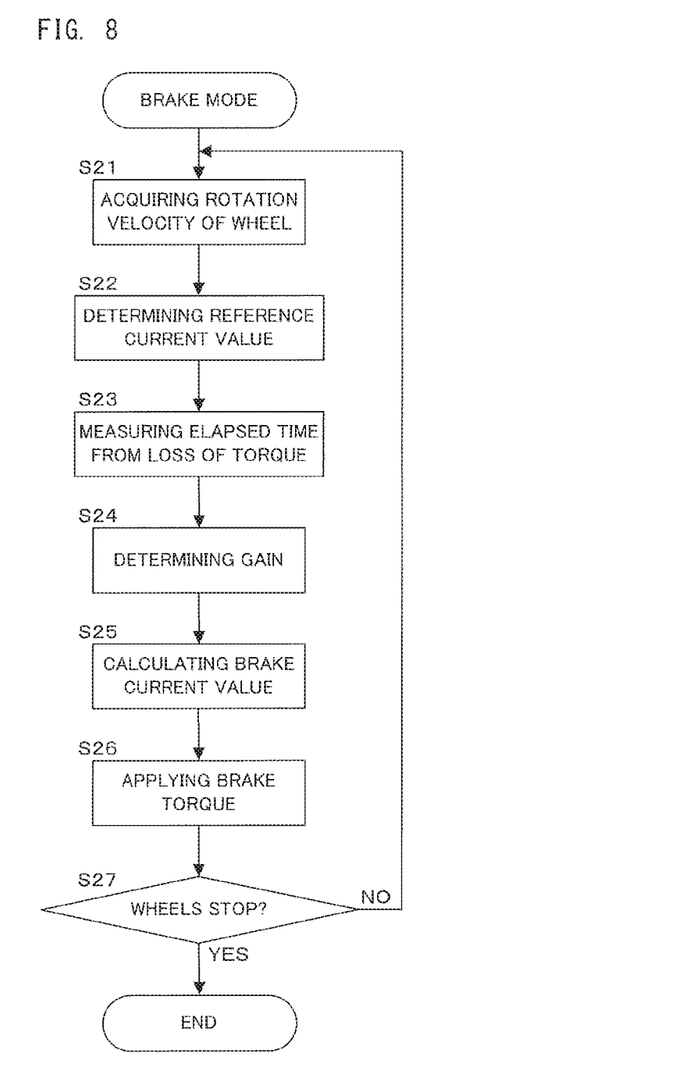
FIG. 8 is a flowchart showing an example of a brake mode performed by the wheel drive control of FIG. 7.

FIG. 7 is a flowchart showing an example of wheel drive control performed by the main control unit in each of the left and right wheels. FIG. 8 is a flowchart showing an example of a brake mode performed by the wheel drive control of FIG. 7. In FIGS. 7 and 8, particularly, the steps are performed in a case in which the wheelchair 1 is to be stopped after the torques applied to the hand rims 13L and 13R are lost. Since the wheel drive control of the wheel 21L is the same as that of the wheel 21R, description will be made herein of the left wheel 21L and description of the right wheel 21R will be omitted.

As shown in FIG. 7, when the assist calculator 91 acquires the torque detection value Td on the hand rim 13L (Step S11), the assist calculator 91 and the assist limiter 92 in cooperation calculate the auxiliary current value Is based on the torque detection value Td (Step S12). Then, a current having the auxiliary current value Is is inputted as the drive command Tc to the drive motor 15L, and the drive motor 15L provides an auxiliary power having a magnitude based on the drive command Tc to the wheel 21L (Step S13). Subsequently, the brake torque determiner 94 confirms that both the torque detection values Td on the hand rims 13L and 13R become zero (Step S14). When the torque detection value Td having an absolute value larger than zero is determined for at least one of the hand rims 13L and 13R ("No" in Step S14), the process goes back to Step S11 and the same operation is repeated until both the torque detection values Td for the hand rims 13L and 13R are lost (i.e., become zero). On the other hand, when it is determined that both the torque detection values Td for the hand rims 13L and 13R are lost in Step S14 ("YES" in Step S14), the process goes to Step S15 and the brake mode is performed.

As shown in FIG. 8, in the brake mode, the brake torque determiner 94 acquires the rotation velocity V of the wheel 21L (Step S21), and converts the rotation velocity V into the reference current value Ibo based on the velocity-dependent conversion rule Rs (Step S22). Further, the brake torque determiner 94 measures the elapsed time t from the time when both the torque detection values Td for the hand rims 13L and 13R are lost (Step S23), and determines the gain Gb from the elapsed time t based on the time-dependent conversion rule Rt (Step S24). Then, the brake torque determiner 94 calculates the brake current value Ib by multiplying the reference current value Ibo by the gain Gb (Step S25). Subsequently, the brake torque which has a magnitude in accordance with the brake current value Ib and acts in a direction reverse to the rotation direction of the wheel 21L is provided to the wheel 21L by the drive motor 15L (Step S26), and the rotation of the wheel 21L is decelerated. In Step S27, it is checked whether the rotation of the wheel 21L is stopped or not, and when the wheel 21L is being rotated ("NO" in Step S27), the operation of Steps S21 to S25 is repeated. Thus, until the rotation of the wheel 21L is stopped ("YES" in Step S27), the brake torque is provided to the wheel 21L and the rotation of the wheel 21L is decelerated.

Figure 9:
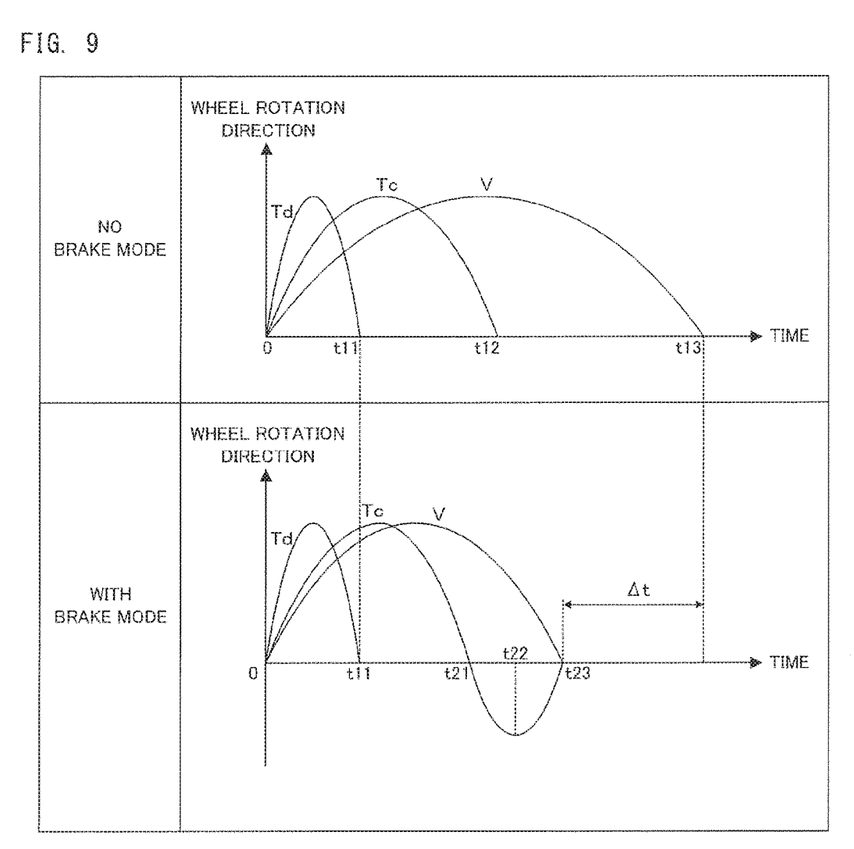
FIG. 9 is a graph schematically showing an example of a comparison between a control result of the wheel drive control without a brake mode and that of the wheel drive control with a brake mode.

FIG. 9 is a graph schematically showing an example of a comparison between a control result of the wheel drive control without a brake mode and that of the wheel drive control with a brake mode. Since the results of the wheel drive controls for the left and right wheels 21L and 21R are the same, description will be made herein of the left wheel 21L and description of the right wheel 21R will be omitted. Further, FIG. 9 shows a case in which both the torques applied to the left and right hand rims 13L and 13R (torque detection values Td) are lost at the same time.

As shown in FIG. 9, regardless of whether the brake mode is performed or not, the drive command Tc (=Is−Ib) is changed in accordance with the change of the torque detection value Td for the hand rim 13L. Then, receiving the torque generated by the drive motor 15L in response to the input of the drive command Tc, the rotation velocity V of the wheel 21L is changed. Further, FIG. 9 emphatically shows delays occurring among the torque detection value Td, the drive command Tc, and the rotation velocity V due to a time constant set in the main control unit 81. This time constant is able to be set and changed for the main control unit 81 by, for example, an external computer or the user I/F 87.

In a case in which no brake mode is performed as shown in the upper column of FIG. 9, when the application of the torque to the hand rim 13L starts at a time "0", the torque detection value Td increases and in response to this increase, the drive command Tc also increases. As a result, the wheel 21L receives the auxiliary power in accordance with the drive command Tc and thus rotates. Also after the torque applied to the hand rim 13L is lost at a time "t11" and the torque detection value Td becomes zero, the drive command Tc in the rotation direction of the wheel 21L is inputted to the drive motor 15L under the influence of the delay due to the above-described time constant. As a result, the wheel 21L is driven by the drive motor 15L in the rotation direction thereof. Then, when the drive command Tc becomes zero at a time t12 in response to the loss of the torque detection value Td, no torque is applied from the drive motor 15L to the wheel 21L and the wheel 21L rotates with inertia. Then, the rotation velocity V of the wheel 21L becomes zero at a time t13 (the rotation of the wheel 21L stops).

On the other hand, in another case in which the brake mode is performed as shown in the lower column of FIG. 9, the control result until the drive command Tc becomes zero at a time t21 is almost the same as that in the case where no brake mode is performed. On the other hand, the control result after the drive command Tc becomes zero at the time t21 is significantly different from that in the case in which no brake mode is performed. Specifically, when the drive command Tc becomes zero at the time t21 in response to the loss of the torque detection value Td, the brake torque acting in a direction reverse to the rotation direction of the wheel 21L is provided to the wheel 21L by the drive motor 15L, and the rotation of the wheel 21L is decelerated (brake mode). Particularly, in a first half period from time t21 to t22, the brake torque increases as a time elapses from the time t21 when the application of the brake torque to the wheel 21L starts. This is a result of the control to increase the gain Gb with the elapsed time t in accordance with the above-described time-dependent conversion rule Rt. Further, in a second half period from time t22 to t23, the brake torque decreases as the rotation velocity V of the wheel 21L decreases and the brake torque becomes zero at the time t23 when the rotation of the wheel 21L stops. This is a result of the control to change the reference current value Ibo with a change in the rotation velocity V in accordance with the above-described velocity-dependent conversion rule Rs. As a result, in the case in which the brake mode is performed, the timing at which the wheel 21L stops is earlier by the time Δt (=t13−t23) as compared to the case in which no brake mode is performed, and in other words, a coasting period of the wheel 21L is reduced by the time Δt.

Figure 10:
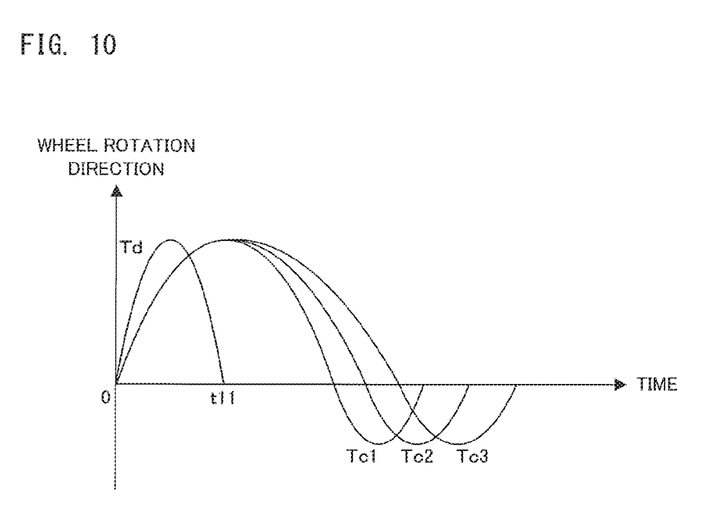
FIG. 10 is a graph schematically showing a relationship of the gain change rate and the drive command with respect to the elapsed time in the time-dependent conversion rule.

As shown in FIG. 6, in the brake mode, a plurality of time-dependent conversion rules Rt in which the gain Gb is changed with respect to the elapsed time t with different change rates are selectively used. Then, by selectively using the time-dependent conversion rules Rt, it is possible to adjust the time variation of the drive command Tc as shown in FIG. 10. FIG. 10 is a graph schematically showing a relationship of the gain change rate and the drive command with respect to the elapsed time in the time-dependent conversion rule. Among the drive commands Tc1 to Tc3 shown in FIG. 10, the drive command Tc1 corresponds to a case in which the change rate of the gain Gb (gain change rate) with respect to the elapsed time t is the largest, the drive command Tc2 corresponds to a case in which the gain change rate is the second largest, and the drive command Tc3 corresponds to a case in which the gain change rate is the third largest. Thus, by selecting the time-dependent conversion rule Rt with a high gain change rate, it is possible to apply the brake torque provided to the wheel 21L (in other words, the period when the drive command Tc becomes negative) earlier and further reduce the coasting period of the wheel 21L.

As described above, by performing the brake mode in which the brake torque acting in a direction reverse to the rotation direction of the wheels 21L, 21R is applied to the wheels 21L, 21R, the rotation of the wheels 21L, 21R rotating in a state in which no torque is applied to the hand rims 13L, 13R are decelerated. Therefore, when the user does not apply the torque to the hand rims 13L, 13R, it is possible to quickly decelerate the rotation of the wheels 21L, 21R with the brake torque. As a result, it is possible to reduce the coasting of the wheelchair 1 and increase the agility thereof.

Further, the controllers 80L, 80R are configured or programmed to start the brake mode at or after the point in time when the torque applied to the hand rims 13L, 13R is lost to decelerate the rotation of the wheels 21L, 21R at or after the point in time when the torque applied to the hand rims 13L, 13R is lost. In such a configuration, when the user releases the hand rims 13L, 13R, it is possible to quickly decelerate the rotation of the wheels 21L, 21R with the brake torque. As a result, it is possible to reduce the coasting of the wheelchair 1 and increase the agility thereof.

Furthermore, the torque sensors 4L, 4R detect the torque applied to the hand rims 13L, 13R, and the controllers 80L, 80R perform the brake mode after the torque sensors 4L, 4R detect the loss of the torques applied to the hand rims 13L, 13R. In such a configuration, when the user releases the hand rims 13L, 13R and the torque sensors 4L, 4R detect the loss of the torque applied to the hand rims 13L, 13R, the rotation of the wheels 21L, 21R is quickly decelerated by the brake torque. As a result, it is possible to reduce the coasting of the wheelchair 1 and increase the agility thereof.

The controllers 80L, 80R are configured or programmed to perform the brake mode on the wheels 21L, 21R, at or after the point in time when the torques applied to both of the hand rims 13L, 13R are lost. In such a configuration, while the user operates at least one of the two wheels 21L and 21R, no brake torque is applied to the other wheel 21L or 21R. Therefore, it is possible to prevent a deterioration in the feeling by the user by applying the brake torque to the wheels 21L, 21R during the user's operation.

Further, the controllers 80L, 80R are configured or programmed to apply the brake torque to the wheels 21L, 21R in the brake mode based on the time-dependent conversion rule Rt in which the brake torque is increased with the elapsed time t after the torques applied to the hand rims 13L, 13R are lost. In such a configuration, it is possible to reduce the impact of braking and achieve a smooth stop of the wheelchair 1.

Furthermore, the controllers 80L, 80R are configured or programmed to apply the brake torque to the wheels 21L, 21R in the brake mode based on the velocity-dependent conversion rule Rs in which the brake torque is increased in accordance with an increase in the rotation velocity V of the wheels 21L, 21R. In such a configuration, when the rotation velocity V is high, a large auxiliary current value Is is outputted based on a large reference current value Iso, and when the rotation velocity V is low, a small auxiliary current value Is is outputted based on a small reference current value Iso. Therefore, the user is able to stop the wheelchair 1 with the same feeling regardless of the rotation velocity V of the wheels 21L, 21R.

The controllers 80L, 80R are configured or programmed to increase the brake torque as time elapses from the point in time when the application of the brake torque to the wheels 21L, 21R starts in the brake mode. In such a configuration, it is possible to quickly decelerate the rotation of the wheels 21L, 21R with the brake torque to reduce the coasting of the wheelchair 1 and increase the agility thereof while alleviating the impact which occurs when the brake torque is applied to the wheels 21L, 21R, to thus achieve a comfortable ride for the user.

Further, the controllers 80L, 80R are configured or programmed to decrease the brake torque as the rotation velocity V of the wheels 21L, 21R decrease in the brake mode. In such a configuration, it is possible to quickly decelerate the rotation of the wheels 21L, 21R with the brake torque to reduce the coasting of the wheelchair 1 and increase the agility thereof while alleviating the impact which occurs when the rotation of the wheels 21L, 21R stop, to thus achieve a comfortable ride for the user.

Furthermore, the controllers 80L, 80R are configured or programmed to reduce the brake torque to zero at or before the point in time when the rotation of the wheels 21L, 21R stop in the brake mode. In such a configuration, it is possible to prevent the wheels 21L, 21R from starting to move again due to a remaining brake torque at the time when the rotation of the wheels 21L, 21R stop.

The drive motors 15L, 15R apply the auxiliary power to the wheels 21L, 21R, and the controllers 80L, 80R are configured or programmed to cause the drive motors 15L, 15R to generate the brake torque in the brake mode. Such a configuration is logical since the auxiliary power and application of the brake torque to the wheels 21L, 21R use the same drive motors 15L, 15R.

In the preferred embodiments described above, the wheelchair 1 corresponds to an "electrically power assisted wheelchair," the hand rim 13L or 13R corresponds to an exemplary "hand rim," the wheel 21L or 21R corresponds to an exemplary "wheel," the control device 8, particularly, the controllers 80L, 80R, the torque sensors 4L, 4R, and the drive motors 15L, 15R in the control device 8 correspond to an exemplary "drive controller," the torque sensor 4L or 4R correspond to a "torque sensor," the drive motor 15L or 15R corresponds to an exemplary "motor," the time-dependent conversion rule Rt corresponds to an exemplary "first conversion rule," and the velocity-dependent conversion rule Rs corresponds to an exemplary "second conversion rule."

The present invention is not limited to the above-described preferred embodiments, but numerous modifications and variations can be added to those described above without departing from the scope of the present invention. For example, during execution of the brake mode shown in FIG. 8 as described above, before the rotation of the wheel 21L stops, the user applies the torque to the hand rim 13L or 13R in some cases. Then, there may be a configuration in which, when the application of the torque to the hand rims 13L, 13R is detected during the execution of the brake mode, the brake mode shown in FIG. 8 is stopped and the process goes back to Step S11 of the wheel drive control shown in FIG. 7.

There may be a configuration in which the user is able to set whether to perform the brake mode in the wheel drive control in the control device 8 through the user I/F 87. In such a configuration, when the user sets that no brake mode should be performed in the wheel drive control, for example, such a control as shown in the column of "NO BRAKE MODE" in FIG. 9 is performed. On the other hand, when the user sets that the brake mode should be performed in the wheel drive control, for example, such a control as shown in the row of "WITH BRAKE MODE" in FIG. 9 is performed.

The respective specific contents of the time-dependent conversion rule Rt and the velocity-dependent conversion rule Rs are able to be changed as appropriate. Further, the control based on at least one of the time-dependent conversion rule Rt and the velocity-dependent conversion rule Rs may be omitted.

The brake mode is performed with the loss of the torques applied to both the hand rims 13L, 13R as a trigger. The trigger to perform the brake mode, however, is not limited to this. The brake mode may be performed, for example, with the absolute values of the torques applied to both the hand rims 13L, 13R becoming smaller than a threshold value larger than zero as a trigger.

Further, though the brake torque is applied to the wheels 21L, 21R by the drive motors 15L, 15R by causing the drive motors 15L, 15R to define and function as a braking device, the wheelchair 1 may be configured so that the brake torque may be applied to the wheels 21L, 21R by any other type of braking device such as a disc brake or the like.

Thus, as described above taking the specific preferred embodiments as examples in the present invention, for example, the following configurations are able to be achieved.

Specifically, the electrically power assisted wheelchair may be configured so that the drive controller is configured or programmed to decelerate the rotation of the wheel at or after the point in time when the torque applied to the hand rim is lost by performing the brake mode at or after the point in time when the torque applied to the hand rim is lost. In such a configuration, when the user releases the hand rim, the rotation of the wheel is able to be quickly decelerated by the brake torque. As a result, it is possible to reduce the coasting of the electrically power assisted wheelchair and increase the agility thereof. Herein, "at or after the point in time" refers to a time at the point in time and after the point in time.

The electrically power assisted wheelchair may be configured so that the drive controller includes a torque sensor that detects a torque to be applied to the hand rim, and performs the brake mode after detecting the loss of the torque applied to the hand rim by the torque sensor. In such a configuration, when the user releases the hand rim and the torque sensor detects the loss of the torque applied to the hand rim, the rotation of the wheel is quickly decelerated by the brake torque. As a result, it is possible to reduce the coasting of the electrically power assisted wheelchair and increase the agility thereof.

The electrically power assisted wheelchair may be configured so that at or after the point in time when the torques applied to both two hand rims are lost, the brake mode is performed for both the wheels. In such a configuration, while the user is operating at least one of the two wheels, no brake torque is applied to any one of the wheels. Therefore, it is possible to prevent a deterioration in the operation by the user by applying the brake torque to the wheel during the user's operation.

The electrically power assisted wheelchair may be configured so that the drive controller is configured or programmed to apply the brake torque to the wheel in the brake mode, wherein the brake torque is determined based on a first conversion rule which increases the brake torque as time elapses after the torque applied to the hand rim is lost. In such a configuration, it is possible to reduce any impact caused by the braking and achieve a smooth stop of the electric wheelchair.

The electrically power assisted wheelchair may be configured so that the drive controller is configured or programmed to apply the brake torque to the wheel in the brake mode, wherein the brake torque is determined based on a second conversion rule which increases the brake torque in accordance with an increase in a velocity of the wheel. In such a configuration, the user is able to stop the electric wheelchair with the same feeling regardless of the velocity of the wheel.

The electrically power assisted wheelchair may be configured so that the drive controller is configured or programmed to increase the brake torque in the brake mode as time elapses from the point in time when application of the brake torque to the wheel starts. In such a configuration, it is possible to quickly decelerate the rotation of the wheel by the brake torque to reduce the coasting of the electrically power assisted wheelchair and increase the agility thereof while alleviating the impact which occurs when the brake torque is applied to the wheel, to thus achieve a comfortable ride for the user.

The electrically power assisted wheelchair may be configured so that the drive controller is configured or programmed to reduce the brake torque in the brake mode as the rotation velocity of the wheel decreases. In such a configuration, it is possible to quickly decelerate the rotation of the wheel by the brake torque to reduce the coasting of the electrically power assisted wheelchair and increase the agility thereof while alleviating the impact which occurs when the rotation of the wheel stops, to thus achieve a comfortable ride for the user.

The electrically power assisted wheelchair may be configured so that the drive controller is configured or programmed to reduce the brake torque to zero in the brake mode at or before the point in time when the rotation of the wheel stops. In such a configuration, it is possible to prevent the wheel from starting to move again due to a remaining brake torque at the time when the rotation of the wheel stops. Herein, "at or before the point in time" refers to a time at the point in time and before the point in time.

The electrically power assisted wheelchair may be configured so that the drive controller includes a motor that applies the auxiliary power to the wheel, and causes the motor to generate the brake torque in the brake mode. Such a configuration is logical since the application of the auxiliary power and application of the brake torque to the wheel uses the same motor.

Preferred embodiments of the present invention can be applied to an electric wheelchair in general, which applies auxiliary power in accordance with a torque applied to a hand rim to a wheel.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An electrically power assisted wheelchair comprising:
a first hand rim;
a first wheel that is rotated by receiving a torque applied to the first hand rim; and
a drive controller configured or programmed to apply auxiliary power to the first wheel based on the torque applied to the first hand rim; wherein
the drive controller is configured or programmed to decelerate rotation of the first wheel in a state in which the first wheel is rotating but no torque is applied to the first hand rim by performing a brake mode in which a brake torque acting in a direction reverse to a rotation direction of the first wheel is applied to the first wheel, the brake torque has a magnitude corresponding to a brake current value obtained by multiplying a reference current value by a gain, the reference current value is obtained by converting a rotation velocity of the first wheel using a velocity-dependent conversion rule that increases the reference current value in accordance with an increase in the rotation velocity of the first wheel, and the gain is obtained by converting an elapsed time based on a time-dependent conversion rule that increases the gain in accordance with an increase of the elapsed time after the torque applied to the first hand rim becomes zero.

2. The electrically power assisted wheelchair according to claim 1, wherein the drive controller is configured or programmed to decelerate the rotation of the first wheel at or after a point in time when the torque applied to the first hand rim becomes zero by performing the brake mode at or after the point in time when the torque applied to the first hand rim becomes zero.

3. The electrically power assisted wheelchair according to claim 2, wherein the drive controller includes a torque sensor that detects a torque applied to the first hand rim, and performs the brake mode after the torque sensor detects that the torque applied to the first hand rim becomes zero.

4. The electrically power assisted wheelchair according to claim 2, further comprising a second hand rim and a second wheel; wherein
at or after a point in time when torques applied to both the first hand rim and the second hand rim become zero, the brake mode is performed for both the first wheel and the second wheel.

5. The electrically power assisted wheelchair according to claim 1, wherein the drive controller is configured or programmed to increase the brake torque in the brake mode as time elapses from a point in time when the brake torque is first applied to the first wheel.

6. The electrically power assisted wheelchair according to claim 1, wherein the drive controller is configured or programmed to reduce the brake torque in the brake mode as the rotation velocity of the first wheel decreases.

7. The electrically power assisted wheelchair according to claim 6, wherein the drive controller is configured or programmed to reduce the brake torque to zero in the brake mode at or before a point in time when the rotation of the first wheel stops.

8. The electrically power assisted wheelchair according to claim 1, further comprising a motor that applies the auxiliary power to the first wheel; wherein
the drive controller is configured or programmed to cause the motor to generate the brake torque in the brake mode.

9. The electrically power assisted wheelchair according to claim 1, wherein the drive controller is configured or programmed to calculate the brake current value based on one time-dependent conversion rule selected from a plurality of time-dependent conversion rules that change the gain with respect to the elapsed time at different change rates.

10. A method of controlling an electrically power assisted wheelchair, the method comprising:
applying auxiliary power to a wheel based on a torque applied to a hand rim of the electrically power assisted wheelchair, which includes the hand rim and the wheel that is rotated by receiving the torque applied to the hand rim; and
decelerating rotation of the wheel that is rotating in a state in which no torque is applied to the hand rim by performing a brake mode in which a brake torque acting in a direction reverse to a rotation direction of the wheel is applied to the wheel; wherein
the brake torque has a magnitude in accordance with a brake current value obtained by multiplying a reference current value by a gain, the reference current value is obtained by converting a rotation velocity of the wheel based on a velocity-dependent conversion rule that increases the reference current value in accordance with an increase of the rotation velocity of the wheel, and the gain is obtained by converting an elapsed time based on a time-dependent conversion rule that increases the gain in accordance with an increase of the elapsed time after the torque applied to the hand rim becomes zero.

* * * * *